(12) United States Patent
Lee et al.

(10) Patent No.: US 11,899,958 B2
(45) Date of Patent: Feb. 13, 2024

(54) METHOD FOR DISCARDING PERSONAL INFORMATION IN NAND FLASH MEMORY

(71) Applicant: KOREA UNIVERSITY RESEARCH AND BUSINESS FOUNDATION, Seoul (KR)

(72) Inventors: Dong Hoon Lee, Seoul (KR); Na Young Ahn, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 69 days.

(21) Appl. No.: 17/783,792

(22) PCT Filed: Dec. 9, 2020

(86) PCT No.: PCT/KR2020/017965
§ 371 (c)(1),
(2) Date: Jun. 9, 2022

(87) PCT Pub. No.: WO2021/118232
PCT Pub. Date: Jun. 17, 2021

(65) Prior Publication Data
US 2023/0013310 A1   Jan. 19, 2023

(30) Foreign Application Priority Data

Dec. 9, 2019 (KR) .......... 10-2019-0162829
Dec. 8, 2020 (KR) .......... 10-2020-0170824

(51) Int. Cl.
*G06F 12/00* (2006.01)
*G06F 3/06* (2006.01)

(52) U.S. Cl.
CPC .......... *G06F 3/0652* (2013.01); *G06F 3/0604* (2013.01); *G06F 3/0679* (2013.01)

(58) Field of Classification Search
CPC .... G06F 3/0652; G06F 3/0604; G06F 3/0679; G06F 21/6245; G06F 21/80; G11C 11/5628; G11C 11/5635; G11C 16/10; G11C 2211/5641; G11C 16/22; G11C 16/14
USPC .......................................... 711/154
See application file for complete search history.

(56) References Cited

U.S. PATENT DOCUMENTS

| | | |
|---|---|---|
| 2010/0226178 A1 | 9/2010 | Nirschl et al. |
| 2011/0153919 A1 | 6/2011 | Sabbag |
| 2013/0275656 A1* | 10/2013 | Talagala ............... G06F 12/0246 711/103 |
| 2019/0317688 A1* | 10/2019 | Cheon ................ G06F 3/0652 |

FOREIGN PATENT DOCUMENTS

| | | |
|---|---|---|
| JP | 5659178 B2 | 1/2015 |
| KR | 10-2012-0118267 A | 10/2012 |
| KR | 10-2019-0045121 A | 5/2019 |

* cited by examiner

*Primary Examiner* — Mardochee Chery
(74) *Attorney, Agent, or Firm* — NSIP Law

(57) ABSTRACT

A method for discarding personal information comprises at least one among partial overwriting, SLC programming, and applying an erase pulse. The method for discarding personal information comprises a step for acquiring the program status of personal information-containing data of a memory block to be erased, generating data having a status that is equal to or higher than the program status corresponding to the personal information, and carrying out a partial overwriting operation on the personal information by using the generated data.

20 Claims, 8 Drawing Sheets

METHOD FOR DISCARDING PERSONAL INFORMATION IN NAND FLASH MEMORY

CROSS REFERENCE TO RELATED APPLICATIONS

This application is a U.S. National Stage Application of International Application No. PCT/KR2020/017965, filed on Dec. 9, 2020, which claims the benefit under 35 USC 119(a) and 365(b) of Korean Patent Application Nos. 10-2019-0162829 filed on Dec. 9, 2019 and 10-2020-0170824 filed on Dec. 8, 2020, in the Korean Intellectual Property Office, the entire disclosures of which are incorporated herein by reference for all purposes.

TECHNICAL FIELD

The present invention relates to a method of discarding personal information in a NAND flash memory.

RELATED ART

A non-volatile memory is divided into an overwritable memory and a non-overwritable memory. NAND flash memory refers to a non-overwritable memory. The NAND flash memory adjusts a threshold voltage by shifting a trap charge according to a basically applied voltage. Data corresponding to the adjusted threshold voltage is determined. Also, in terms of management, the NAND flash memory has an issue with respect to residual data related to deletion since a write unit and a delete unit differ. In general, valid data is collected in a single block through a garbage collection and, upon arrival at an internal specific criterion, remaining valid data is erased in units of blocks. However, due to characteristics of NAND flash memory, although a user deletes data from the NAND flash memory, significant information may be easily acquired through digital forensics. Since digital forensics is easy, anyone may illegally acquire user-related information through the digital forensics. If this information is personal information, the problem is obvious.

Existing NAND flash memory cannot be overwritten. Therefore, although a user deletes personal information stored in the NAND flash memory, an original data type is highly likely to remain. Currently, a data center uses a solid state drive (SSD) that uses NAND flash memory and there is a high probability that personal information protection data is not protected in the SSD of the data center. A personal information deletion duty also applies to the NAND flash memory.

A method of destroying personal information using an overwritable program operation rather than an erase operation is introduced. A simple method of deleting multi-level cell (MLC) data is proposed as existing one-shot programming. However, a one-shot programming scheme has an issue of changing a storage capacity of NAND flash memory. Since a number of MLC pages changes to single level cell (SLC) pages, a number of pages in a single memory block significantly decreases. This represents changing a size of the storage capacity. Therefore, it is difficult to use this approach scheme in terms of management.

Accordingly, there is a need for technology for quickly discarding personal information without affecting cell characteristics.

DETAILED DESCRIPTION

Technical Subject

The present invention provides a method of quickly discarding personal information without affecting cell characteristics.

Technical Solution

To achieve the above objectives, a method of discarding personal information according to example embodiments of the present invention includes acquiring a program state of data of a memory block to be deleted including personal information; generating data of a state equal to or higher than the program state corresponding to the personal information; and performing a partial overwriting operation on the personal information using the generated data.

To achieve the above objectives, a method of discarding personal information according to example embodiments of the present invention includes performing an on-the-fly invalid page program operation on an invalid page included in a memory block to be deleted including personal information, the on-the-fly invalid page program operation performing a single level cell (SLC) program operation based on a threshold voltage.

To achieve the above objectives, a method of discarding personal information according to example embodiments of the present invention includes applying a deletion duty pulse to a wordling corresponding to an invalid page included in a memory block to be deleted including personal information, the deletion duty pulse being determined to be greater than a pass voltage Vpass and a number of the deletion duty pulses being determined to exceed an error correction level of error correction code (ECC) technology.

Effect of Invention

According to some example embodiments of the present invention, it is possible to immediately apply to existing NAND flash memory and to simply and quickly discard personal information without affecting cell characteristics.

Also, it is expected to significantly reduce a degradation in memory performance compared to an existing deletion duty and to achieve a significant effect in terms of time and cost.

BRIEF DESCRIPTION OF DRAWINGS

Detailed description of each drawing is provided to more fully understand drawings cited in the detailed description of the present invention.

BEST MODE

Figure 1:
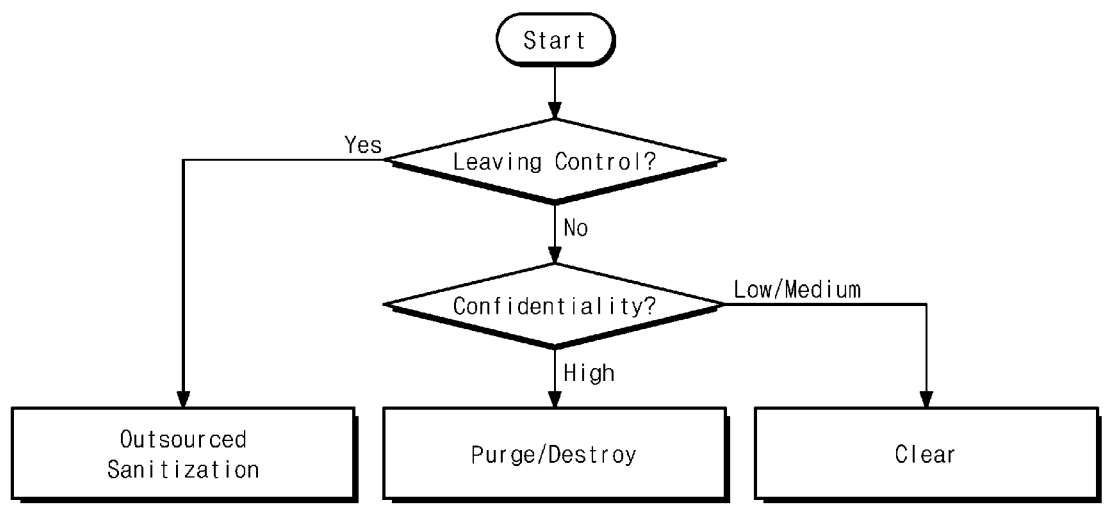
FIG. 1 is a flowchart illustrating a guideline for destroying personal information of NAND flash memory.

The following structural or functional descriptions of example embodiments according to the concept of the present invention described herein are merely intended for the purpose of describing the example embodiments according to the concept of the present invention and may be implemented in various forms. However, it should be understood that these example embodiments are not construed as limited to the illustrated forms.

Since various modifications may be made to the example embodiments according to the concept of the present invention, the example embodiments are illustrated in the drawings and described in detail in the present specification. Here, the example embodiments are not construed as limited to specific implementations and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present invention.

When it is mentioned that one component is "connected" or "accessed" to another component, it may be understood that the one component is directly connected or accessed to another component or that still other component is interposed between the two components. In addition, it should be noted that if it is described in the specification that one component is "directly connected" or "directly joined" to another component, still other component may not be present therebetween. Likewise, expressions, for example, "between" and "immediately between" and "adjacent to" and "immediately adjacent to" may also be construed as described in the foregoing.

The terminology used herein is for the purpose of describing particular example embodiments only and is not to be limiting of the present invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, the example embodiments of the present invention will be described in detail with reference to the accompanying drawings. However, the scope of the claims is not limited or restricted by the example embodiments. Like reference numerals refer to like components throughout.

Prior to describing a personal information discarding method according to the present invention, a guideline for a general personal information discarding method and the existing personal information discarding method are described.

In general, a personal information lifecycle includes collect, store, use/provide, and destroy. Discarding of personal information is a final stage of the personal information lifecycle. A media deletion may be largely divided into Clear/Purge/Destroy.

'Clear' refers to technology for overwriting insignificant data using software or hardware. In this manner, a new value of a storage device is overwritten using a general read or write command. In the case of a device that does not provide overwrite, such as NAND flash memory, clear indicates that it is set to a factory state. 'Purge' refers to physical or logical technology that makes target data unrecoverable using an experimental design. 'Destroy' refers to making target data unrecoverable and, at the same time, not acting as a data storage medium using laboratory technology.

In general, there is a guideline for destroying personal information of NAND flash memory. FIG. 1 is a flowchart illustrating a guideline for destroying personal information of NAND flash memory.

Referring to FIG. 1, there is a description of a flash memory according to clear/purge that follows a National Institute of Standards and Technology (NIST) standard. As described in the description of clear of the NIST standard, although a flash memory-based storage device includes a spare cell and performs a wear leveling, old data may not be completely deleted. This is because the storage device does not directly designate addresses of all areas in which significant data is stored. Here, a clear operation is to overwrite an addressable space with insensitive data in response to an existing read/write command using a software/hardware product.

The NIST standard also refers to discarding of personal information data called "purge." Here, since an erase operation includes overwrite, block delete, and cryptographic delete. However, NAND flash memory is highly likely to store personal information in a nonaddressable space in which overwrite is not supported, it is difficult to accept the fact that the NIST standard has properly implemented discarding of personal information. Personal information that is not mapped to an address still remains in NAND flash memory.

In the case of a general flash memory, if a free block is insufficient in a user block area due to a defective block, a free block in a free block area is allocated to the user block area. Here, since a size of allocation is a block unit (or at least two blocks), a larger space than a required storage space is allocated. Also, the free block in the free block area is shortened in a relatively short period of time and a flash conversion layer performs a background operation, such as garbage collection, to secure the free block.

Figure 2:
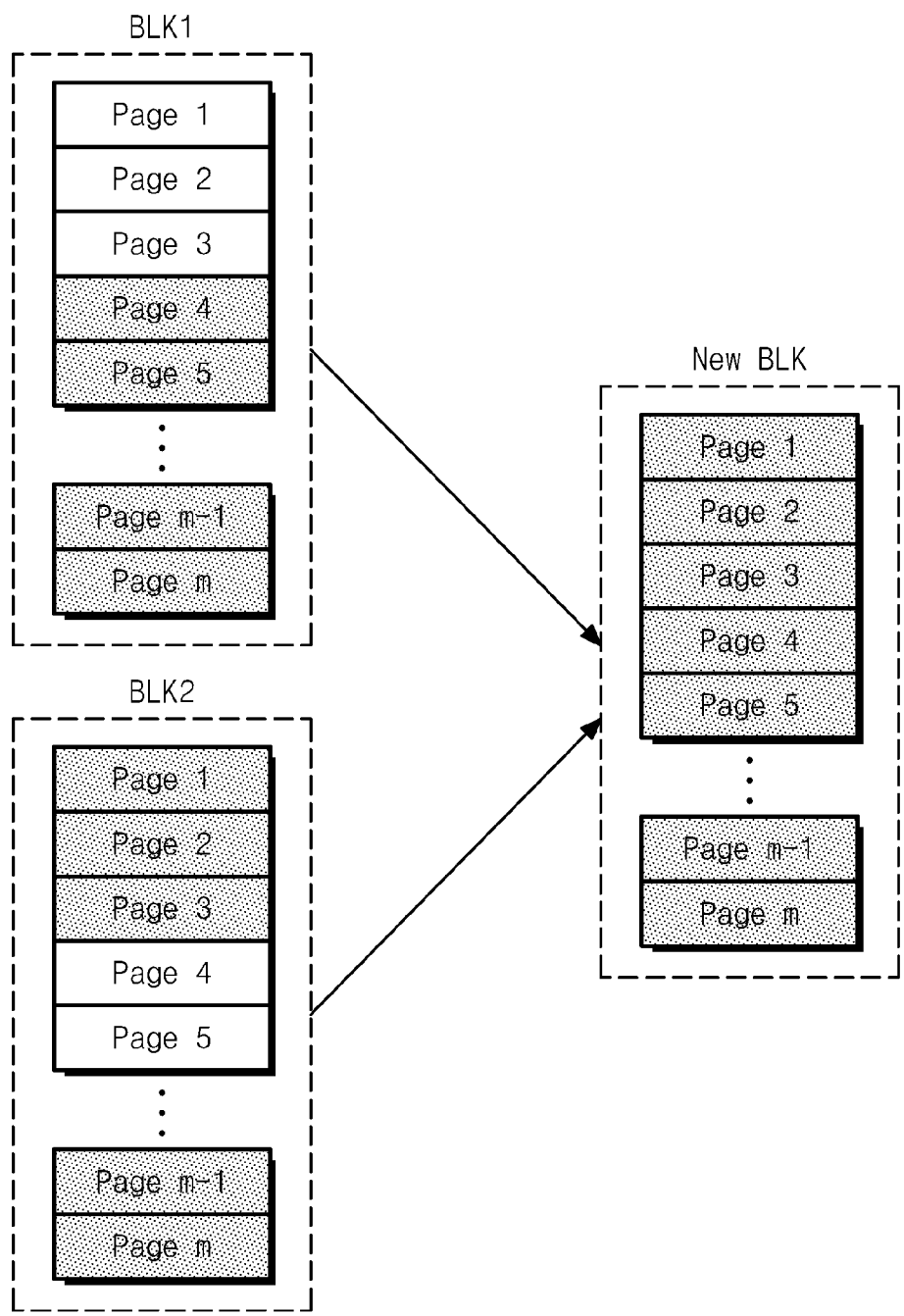
FIG. 2 illustrates a garbage collection for forming a free block.

FIG. 2 illustrates a garbage collection for forming a free block. Referring to FIG. 2, the garbage collection refers to a process of selecting a specific block from a memory array, copying a valid page of the specific block to a free block, and then erasing a block to make it a free block.

The deleted block may be used to write data later. However, due to an internal policy, an erase operation for such a block does not proceed quickly. In this case, if personal information is included in a valid page, the same personal information may be included in an invalid page. The personal information is included in all of a valid page of a free block and an invalid page of a block to be deleted. As a result, the personal information is likely to be included in two blocks and is maintained to be mapped to only one of the blocks and to be unmapped to the other block.

Figure 3:
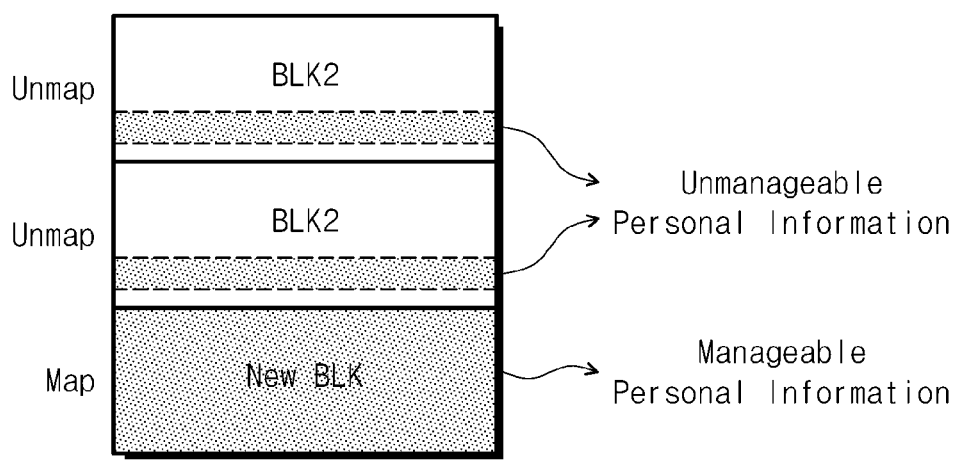
FIG. 3 illustrates unmanageable personal information.

FIG. 3 illustrates unmanageable personal information. Referring to FIG. 3, in the case of performing an existing garbage collection, unmanageable personal information is present in at least two blocks. An unmapped first block (BLK1) and second block (BLK2) retain personal information until an erase operation is performed.

The concern relates to a method of destroying personal information included in an invalid page of a block to be deleted. One of the simplest methods of discarding personal information is to immediately delete the block including the invalid page in which the personal information is included. However, since an erase operation is performed in units of blocks, it is difficult to manage a storage device in terms of a policy. In general, a single block includes 1,024 pages. Due to an invalid page that stores personal information among 1,024 pages, if the erase operation is performed on a single block, large management cost is required.

The existing NAND flash technology does not support overwrite. A reliable data invalidation method relates to performing an erase operation on BLK1 and BLK2. However, as is known, the erase operation is one of management operations to be avoided as much as possible since a number of erase cycles for a memory block is limited in terms of wear leveling. Also, the erase operation consumes a large amount of power and a significant amount of erase time. From a perspective of a provider, the focus is on ensuring that the erase operation does not occur as quickly as possible.

Such concern on a supplier and the needs of a user that desires to completely remove personal information data from a flash memory start to be met. To summarize the existing technology, an existing NAND flash memory writing method does not support overwrite, but is approached in terms of discarding personal information. Therefore, the existing NAND flash memory writing method is applied to overwrite an invalid page with random data. Here, all the data needs to be data writable to a currently stored invalid page. Since it takes 1,000 times or more to perform a single page write (program) operation and an erase operation for one block, this method is very effective as a personal information discarding method.

Hereinafter, a personal information discarding method according to an example embodiment of the present invention is described. The personal information discarding method may also be referred to as an operation method of a NAND flash memory device. Also, the personal information discarding method may refer to an operation by a controller of the NAND flash memory.

Data Modulation

In general, data is not stored in a form of original data in NAND flash memory. To minimize a data correction probability due to interference between data to be programmed, original data is randomized according to a predetermined rule and the randomized data is stored in a physical area.

Figure 4:
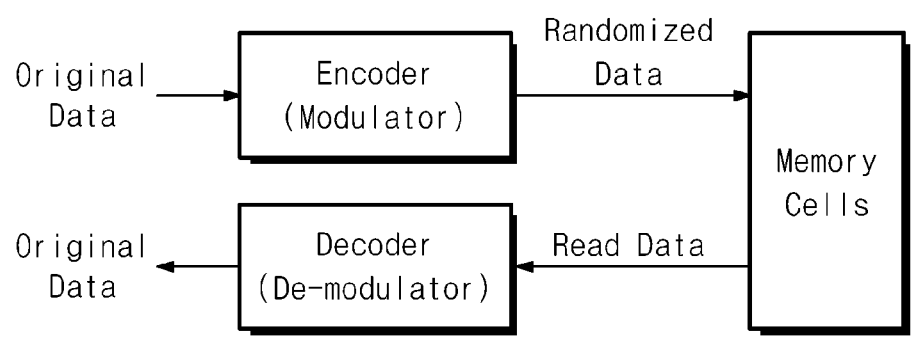
FIG. 4 illustrates a data modulation of NAND flash memory.

FIG. 4 illustrates a data modulation of NAND flash memory. Referring to FIG. 4, an encoder configured to modulate data and a decoder configured to demodulate data read from a physical area are essentially included.

A program operation refers to modulating error null data and then programming modulated data to a memory cell. A read operation may demodulate data read from the memory cell and then output original data. A binary bit corresponding to the original data, that is, personal information is not strictly stored in the memory cell. However, the modulated data may be stored in the memory cell, and the stored modulated data and the original data may be exchanged using a predetermined method. Therefore, the modulated data is also regarded as the personal information.

State Mapping

Data modulated data is mapped according to a program state corresponding to a threshold voltage (Vt) of a memory cell.

Figure 5:
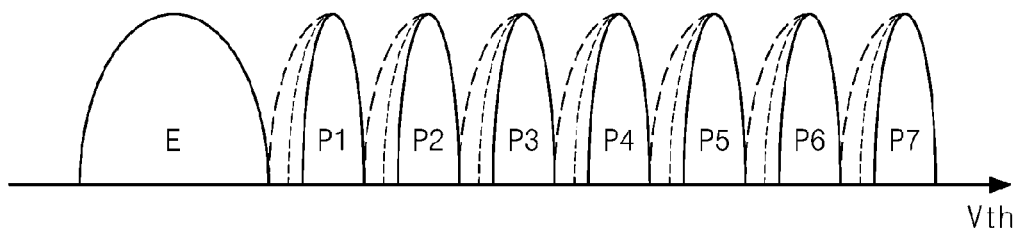
FIG. 5 illustrates a state mapping in a 3-level cell program.

FIG. 5 illustrates a state mapping in a 3-level cell program.

Referring to FIG. 5, for example, in the case of a 3-level cell, state E is mapped to '111', state P1 is mapped to '011', state P2 is mapped '001', state P3 is mapped to '000', state P4 is mapped to '010', state P5 is mapped to '110', state P6 is mapped to '100', and state P7 is mapped '101'. That is, a program state is determined using a most significant bit (MSB), a center significant bit (CSB), and a least significant bit (LSB).

Performing a write operation in NAND flash memory represents making each memory cell have one of eight threshold voltages. NAND flash memory basically includes a plurality of memory blocks, each of the plurality of memory blocks includes a plurality of pages, and each of the plurality of pages includes a plurality of memory cells. In general, NAND flash memory performs write or read in units of pages and performs erase in units of blocks.

Overwriting NAND Flash Memory

In general, it is known that NAND flash memory is non-overwritable. However, there is at least one state in which NAND flash memory is partially overwritable and a data bit corresponding to an overwritable state is present. In 3-level programming, there is almost no probability that all the programmed states are top state P7. Since a randomization technique is applied, a probability that data corresponding to a highest state will be recorded is ⅛ or less. It represents that at least one state below the top state corresponds to an overwritable state.

Overwritable State

As mentioned in state mapping, each memory cell has a threshold voltage corresponding to one of eight states. A write operation of NAND flash memory is repeated by sequentially applying a voltage to a wordling corresponding to a page and verifying whether a threshold voltage related to a corresponding bit is exceeded. Here, since a threshold voltage of a memory cell of which program is completed is highly unlikely to be in a final state (P7), a state (E to P6) below the final state (P7) may be overwritten. An overwritable state is of an interest.

Overwritable Data

As described above, it can be known that there is a state in which overwriting is possible. Therefore, if a bit of data currently written in a memory cell is known, a writable state may be determined and writable data for the writable state may be determined.

Figure 6:
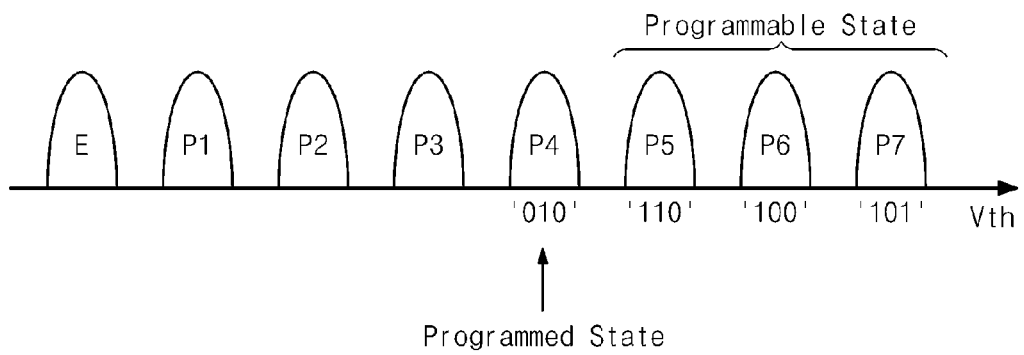
FIG. 6 illustrates an example of overwritable data.

FIG. 6 illustrates an example of overwritable data. Referring to FIG. 6, for example, in the case of state P4 corresponding to '010' of a programmed memory cell, an overwritable state is an upper state, that is, states P5 to P7. Therefore, data overwritable to a memory cell includes '110', '100', and '101'.

In an MLC program operation, it is found that overwriting is possible for a state higher than a programmed state. However, since such overwriting is basically based on a program operation, a program failure may occur. Here, program interference affects valid data of an adjacent page due to a current programming operation. Delete according to an example embodiment of the present invention enables overwriting while minimizing effect of such program interference.

Also, to overwrite a page, it is inevitable to read data of a current page, to verify an overwritable state from the read data, and to generate data to be overwritten. However, unless cost for all the aforementioned processes is greater than cost used for immediately destroying personal information of NAND flash memory, this approach scheme needs to be used inevitably.

Figure 7:
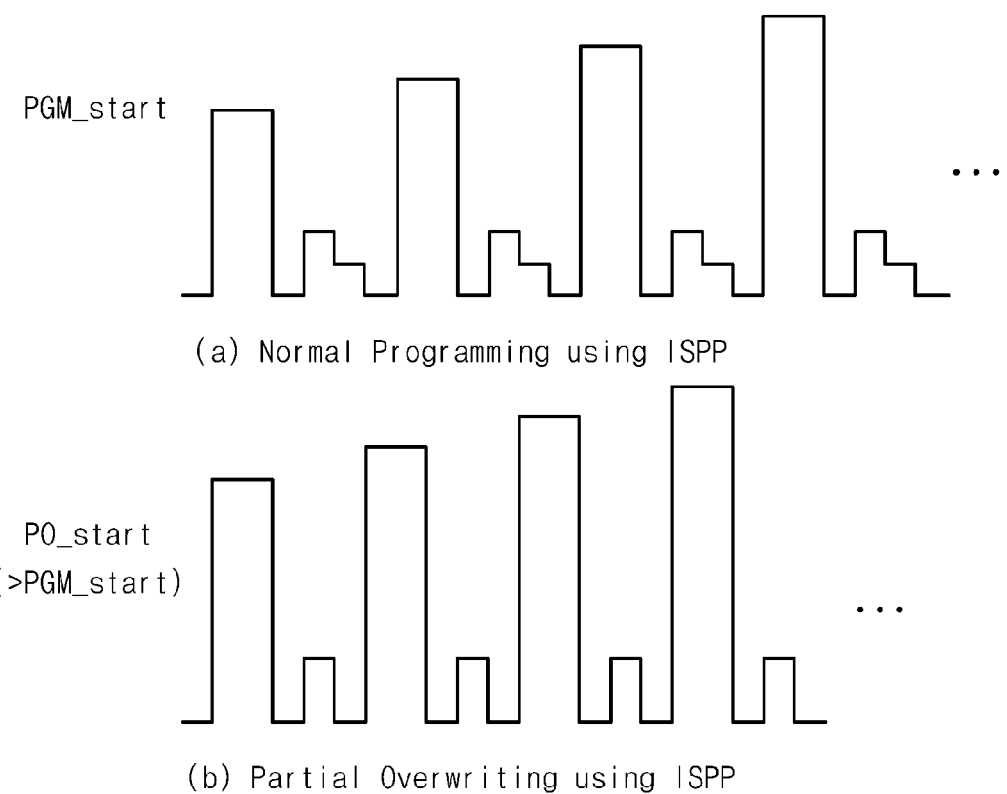
FIG. 7 illustrates a method of discarding personal information according to an example embodiment of the present invention.

FIG. 7 illustrates a method of discarding personal information according to an example embodiment of the present invention. Referring to FIG. 7, partial overwriting may be performed using the aforementioned ISPP. An initial overwrite pulse (PO_start) may be higher than an initial program pulse (PGM_pulse) of a normal program operation. Also, a number of verification pulses in a partial overwriting operation may be set to be less than a number of verification pulses in a normal program operation. This is because, in many cases, a program state in which an overwriting operation is performed is expected to have a relatively high threshold voltage.

Hereinafter, a method of deleting a personal identification number using partial overwriting is described as an example.

Table 1 refers to a table to describe a personal information discarding method according to an example embodiment of the present invention.

TABLE 1

| Personal Inform. | | | | | | | | | | | | | | | | 661004 |
|---|---|---|---|---|---|---|---|---|---|---|---|---|---|---|---|---|
| Binary Bits (48) | | | | | 001101100011011000110001001100000011000000110100 | | | | | | | | | | | |
| Random Bits (48) | | | | | 110110001101100011000100110000001100000011010000 | | | | | | | | | | | |
| State Mapping (16) | P5 | P5 | P2 | P7 | P6 | P1 | P3 | P6 | P5 | P3 | P2 | P6 | P3 | P1 | P4 | P3 |
| Partial Overwritable States (16) | P6 | P6 | P3 | | P7 | P2 | P4 | P7 | P6 | P4 | P3 | P7 | P4 | P2 | P5 | P4 |
| | P7 | P7 | P4 | | | P3 | P5 | | P7 | P5 | P4 | | P5 | P3 | P6 | P5 |
| | | | P5 | | | P4 | P6 | | | P6 | P5 | | P6 | P4 | P7 | P6 |
| | | | P6 | | | P5 | P7 | | | P7 | P6 | | P7 | P5 | | P7 |
| | | | P7 | | | P6 | | | | | P7 | | | P6 | | |
| | | | | | | P7 | | | | | | | | P7 | | |
| Selected State (16) | P6 | P7 | P3 | P7 | P7 | P4 | P5 | P7 | P6 | P4 | P5 | P7 | P5 | P2 | P5 | P4 |
| PO Bits (48) | | | | | 100101000101101011010110001011010111000111100010 | | | | | | | | | | | |
| Derandom Bits (48) | | | | | 001100010011000000110000001100010011000000110001 | | | | | | | | | | | |
| Purge | | | | | | | | | | | | | | | | 100101 |

Hereinafter, a method of discarding personal information data of NAND flash memory using an overwritable state according to an example embodiment of the present invention is described. An information discarding method according to example embodiments of the present invention includes at least one of a partially overwriting scheme, a single level cell (SLC) programming scheme, and a deletion duty pulse application scheme.

1. Partial Overwriting

It is assumed that personal information is included in invalid data of a memory to be deleted. There may be binary data corresponding to the personal information and data to modify the same. Information on a program state may be acquired through each state mapper of modulated data. When the program state corresponding to the personal information is acquired, data corresponding to a state that is equal to or higher than the programmed state may be generated. Then, a write operation may be performed on a page in which invalid data is programmed with the generated data. The personal information may be discarded by this overwriting operation.

In general, a program operation of NAND flash memory is performed by incremental step pulse programming (ISPP). A specific pulse is applied to a wordline and a pulse increased by a predetermined value is applied to a wordline for each step. This operation is repeated until a state corresponds to a desired threshold voltage. Whether a pulse is applied is verified to verify the state after an initial program pulse (PGM_start). When this program set is in progress, whether the pulse is applied is verified after a preset number of program pulses are applied.

For clarity of description, the personal identification number is assumed as '661004'. The personal identification number may be changed to a binary as in Table 1. A state change of Table 1 in which a partial overwriting state is selected is selected. Binary bits corresponding to '661004' are '001101100011011000110001001100000011000000110000001 10100'. In the case of randomizing the binary bits through a random algorithm, the randomized bits are '110110001101100011000100110000001100000011010000'. States corresponding to the randomized bits are selected. The selected states include P5-P5-P2-P7-P6-P1-P3-P6-P5-P3-P2-P6-P3-P1-P4-P3. Each selected state is programmed in a corresponding memory cell of a page. As described above, a program operation for the state corresponding to the personal information is performed in the memory cell. Then, in response to a request for discarding personal information of programmed memory cells, partial overwriting may be performed as follows.

A partial overwritable state for the personal identification number 661004 may be configured using various overwritable states as shown in Table 1. No operation is performed in top program state P7. Therefore, a program state chain selected for partial overwriting is P6-P7-P3-P7-P7-P4-P5-P7-P6-P4-P5-P7-P5-P2-P5-P4. Therefore, the selected state chain is programmed to a memory cell. A state to be used for partial overwriting may be randomly selected.

However, without being limited thereto, the top state P7 or state P6 immediately below P7 may be selected. If the top state P7 is selected as a partial overwriting state, there is a probability that a memory cell is physically destroyed due to an excessive program operation.

Through the partial overwriting, whether personal information data is successively deleted may be verified. When performing a state read operation on a partially overwritten memory cell, PO bits include '100101000101101 010110101100010110101110001110010'. Derandomized bits include '0011000100110000001100000011000100 11000000110001'. Therefore, a value of ASCII corresponding to the derandomized bits is '100101'. Therefore, the personal information (661004) is completely destroyed in the memory cell.

Meanwhile, to reduce burden of selecting one of the overwritable states, partial overwriting may be performed only in a program state lower than a specific program state. For example, partial overwriting may perform a batch program operation for states E, P1, P2, P3, and P4 lower than fifth program state P5 in the fifth program state P5. That is, memory cells having states lower than the fifth program state P5 may be programmed in the fifth program state P5 and memory states having states higher than the fifth program state P5 are maintained in a current state.

A state chain of Table 2 in which a partial overwriting state is selected beyond a specific program state is selected.

Figure 8:
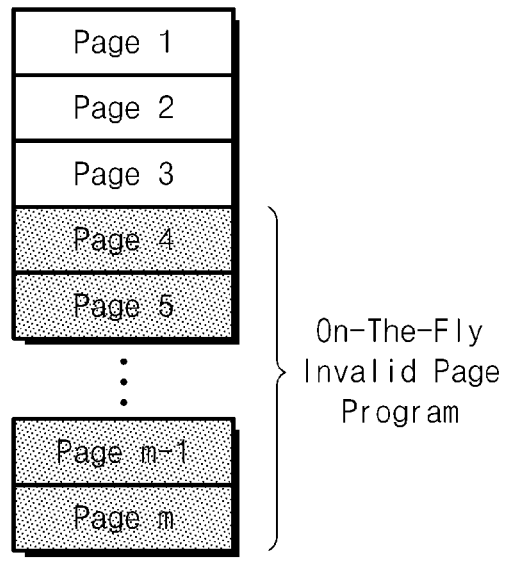
FIG. 8 illustrates an on-the-fly invalid page program.
Figure 9:
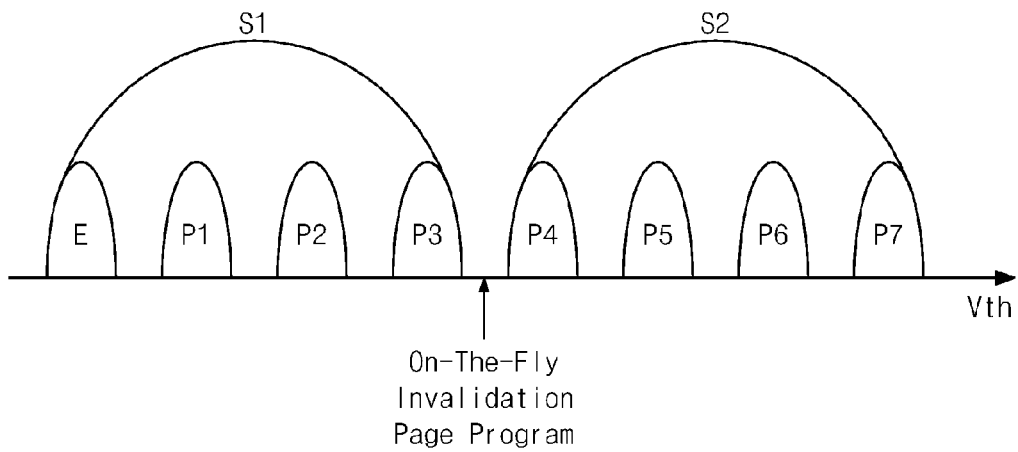
FIG. 9 illustrates a method of discarding personal information according to an example embodiment of the present invention.

FIG. 8 illustrates an on-the-fly invalid page program, and FIG. 9 illustrates a method of discarding personal information according to an example embodiment of the present invention.

Referring to FIG. 8, the on-the-fly invalid page program may perform an SLC program operation based on a specific threshold voltage.

A main controller may immediately force an invalid page program to an invalid page before processing an invalid block. This immediate invalid page program operation may be performed by performing an SLC program operation on random data of a programmed multi-level cell. The concept is slightly different from the aforementioned overwriting technique. In a partial overwriting technique, data of three pages is generated and programmed for discarding personal information. However, the immediate invalid page programming technique is sufficient to generate and program only data of a single page. Also, there is no need to verify whether the program is successful.

Referring to FIG. 9, an immediate invalid page program manipulation using an SLC program (MLC PGM→SLC PGM) is illustrated. For example, personal information

TABLE 2

| Personal Inform. | | | | | | | | | | | | | | 661004 | | |
|---|---|---|---|---|---|---|---|---|---|---|---|---|---|---|---|---|
| Binary Bits (48) | | | | | 001101100011011000110001001100000011000000110100 | | | | | | | | | | | |
| Random Bits (48) | | | | | 110110001101100011000100110000001100000011010000 | | | | | | | | | | | |
| State Mapping (16) | P5 | P5 | P2 | P7 | P6 | P1 | P3 | P6 | P5 | P3 | P2 | P6 | P3 | P1 | P4 | P3 |
| Partial | P6 | P6 | P3 | | P7 | P2 | P4 | P7 | P6 | P4 | P3 | P7 | P4 | P2 | P5 | P4 |
| Overwritable | P7 | P7 | P4 | | | P3 | P5 | | P7 | P5 | P4 | | P5 | P3 | P6 | P5 |
| States (16) | | | P5 | | | P4 | P6 | | | P6 | P5 | | P6 | P4 | P7 | P6 |
| | | | P6 | | | P5 | P7 | | | P7 | P6 | | P7 | P5 | | P7 |
| | | | P7 | | | P6 | | | | | P7 | | | P6 | | |
| | | | | | | P7 | | | | | | | | P7 | | |
| Selected State (16) | P5 | P7 | P5 | P7 | P6 | P5 | P5 | P6 | P5 | P5 | P5 | P6 | P5 | P5 | P5 | P5 |
| PO Bits (48) | | | | | 100101000101101010110101100010110101110001110010 | | | | | | | | | | | |
| Derandom Bits (48) | | | | | 110001001100000011000100110001001100000011000100 | | | | | | | | | | | |
| Purge | | | | | | | | | | | | | | | | |

According to the above method, a program state chain selected for partial overwriting is P5-P7-P5-P7-P6-P5-P5-P6-P5-P5-P5-P6-P5-P5-P5-P5. P0 bits corresponding to the state chain include '1001010001011010101 10101100010110101110001110010' and is programmed to a memory cell. A value of ASCII corresponding to this binary code is 'ÄÀÄÄÀÄ'. Therefore, personal information data is completely destroyed. The aforementioned method is practically possible since a randomization scheme is applied to equalize a number of bits to be programmed. When modulating original data, numbers of a specific state (e.g., an intermediate program state) are randomized and thus similar to remaining numbers. Therefore, a reverse analysis attack in which an attacker overwrites this part is blocked as a source.

2. SLC Programming

In general, NAND flash memory performs an MLC program operation. When a target page is invalidated due to an operation, such as a garbage collection, an immediate invalid page program operation for discarding personal information is performed before processing a corresponding memory block as an invalid block. Here, the immediate invalid page program operation performs an SLC program operation based on a specific reference level instead of the MLC program operation.

stored by 3-step cell program is destroyed by 1-step cell program. Therefore, it may be referred to as an SLC programming technique.

3. DDP

In general, although a power voltage is applied to a body area of a memory cell, charge transfer may occur by Fowler-Nordheim (FN) tunneling if a wordline voltage of a predetermined value or more is applied to a wordline connected to the memory cell. It represents that an operation of discarding invalid data may be easily performed. That is, if a wordline pulse is applied to a wordline corresponding to an invalid page in which personal information is present without applying a power voltage to a body side, the entire personal information may be easily discarded. This is because a threshold voltage may be changed to a completely unknown state.

Figure 10:
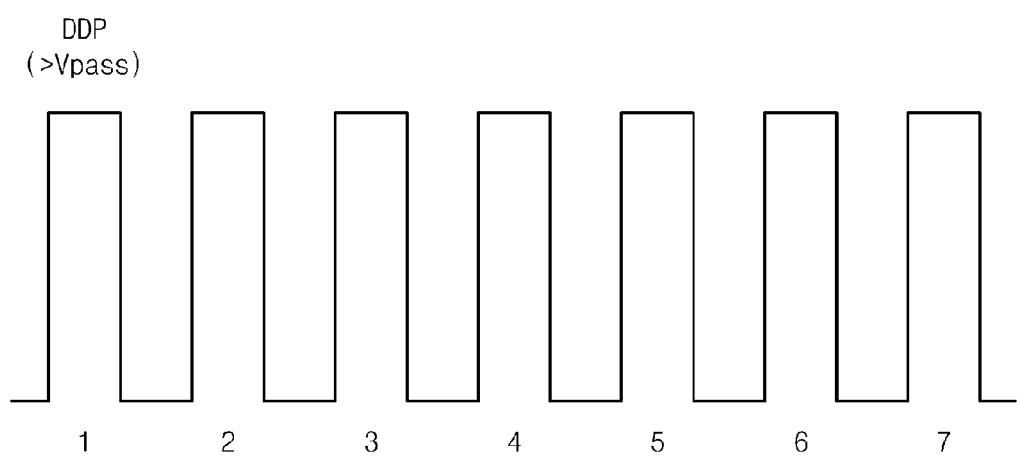
FIG. 10 illustrates a method of discarding personal information according to an example embodiment of the present invention.

FIG. 10 illustrates a method of discarding personal information according to an example embodiment of the present invention.

Referring to FIG. 10, this wordline pulse is called a deletion duty pulse (DDP). In response to a request from a host or a self-request from NAND flash memory, the DDP may be applied to an invalid page. After applying this DDP, there is no need to verify a data state and a verification pulse is not required accordingly. A level of the DDP may be higher than a pass voltage (Vpass). In general, if a voltage lower than the pass voltage (Vpass) is applied to a wordline, charge is not delivered. Also, a number of DDPs needs to be experimentally determined. For example, the number of DDPs may be determined to be less than a number of conventional program pulses or a level thereof. The number of DDPs may be determined to minimize program interference.

In general, NAND flash memory uses error correction code (ECC) technology to correct data due to data degradation. The number of DDPs needs to be determined to exceed an error correction level of ECC technology. Such number of experimental DDPs varies according to cell characteristics of a NAND chip manufacturing company.

Personal Information Discarding Request

In response to receiving a personal information discarding request form a host, a main controller preferentially identifies a block in which an invalid page is present with respect to an unaddressed area (e.g., BLK1, BLK2) in NAND flash memory. Then, a partial overwriting (PO) operation or a DDP operation is performed on the block in which the invalid page is present.

Figure 11:
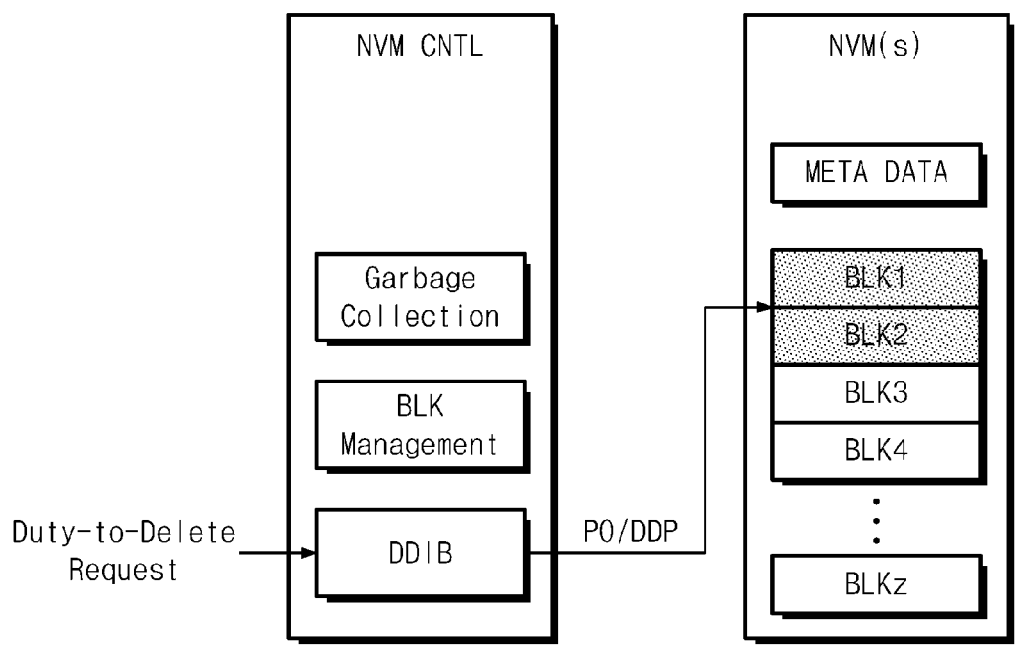
FIG. 11 illustrates an apparatus for performing a personal information discarding method according to an example embodiment of the present invention.

FIG. 11 illustrates a storage device for performing a personal information discarding method according to an example embodiment of the present invention. Referring to FIG. 11, the storage device may include one or more non-volatile memory devices (NVM(s)) and a memory controller (CNTL) configured to control the same.

Also, the non-volatile memory device (NVM) may be implemented to include a plurality of memory blocks (BLK1~BLKz, z denotes an integer of 2 or more) and a control logic. Each of the plurality of memory blocks (BLK1~BLKz) may include a plurality of pages (Page 1~Page m, m denotes an integer of 2 or more). Each of the plurality of pages (Page 1~Page m) may include a plurality of memory cells. Each of the plurality of memory cells may store at least one bit.

The controller (CNTL) may be connected to at least one non-volatile memory device (NVM) through a plurality of control pins for transmitting control signals (e.g., CLE, ALE, CE(s), WE, RE, etc.). Also, the controller (CNTL) may be implemented to control the non-volatile memory device (NVM) using the control signals (CLE, ALE, CE(s), WE, RE, etc.). For example, the non-volatile memory device (NVM) may perform a program operation/read operation/ erase operation by latching a command (CMD) or an address (ADD) at an edge of a write enable (WE) signal according to a command latch enable (CLE) signal and an address latch enable (ALE) signal.

The controller (CNTL) may include at least one processor. The processor may be implemented to control the overall operation of the storage device. The processor may perform various management operations, such as a cache/ buffer management, a firmware management, a garbage collection management, a wear leveling management, a data duplication removal management, a read refresh/reclaim management, a bad block management, a multi-stream management, a mapping management of host data and a non-volatile memory, a quality of service (QoS) management, a system resource allocation management, a non-volatile memory queue management, a read level management, an erase/program management, a hot/cold data management, a power loss protection management, a dynamic heat management, an initialization management, and a redundant array of inexpensive disk (RAID) management.

Also, the non-volatile memory device (NVM) may include a memory cell array, a row decoder, a page buffer circuitry, an input/output (I/O) buffer circuitry, a voltage generator, and a control logic.

The memory cell array may be connected to the row decoder through wordlines or selection lines. The memory cell array may be connected to the page buffer circuitry through bitlines. The memory cell array may include a plurality of cell strings. A channel of each of the cell strings may be formed in a vertical direction or a horizontal direction. Each of the cell strings may include a plurality of memory cells. Here, the plurality of memory cells may be programmed, erased, or read by a voltage provided to a bitline or a wordline.

The row decoder may be implemented to select one of memory blocks (BLK1~BLKz) of a memory cell array in response to a received address. The row decoder may select a single wordline from among wordlines of the memory block selected in response to the address. The row decoder may deliver a wordline voltage corresponding to an operating mode to the selected wordline of the memory block. In a program operation, the row decoder may apply a program voltage and a verification voltage to the selected wordline and may apply a pass voltage to an unselected wordline. In a read operation, the row decoder may apply the program voltage and the verification voltage to the selected wordline and may apply the pass voltage to the unselected wordline.

The page buffer circuitry may be implemented to operate as a write driver or a sense amplifier. During a program operation, the page buffer circuitry may apply a bitline voltage corresponding to data to be programmed to bitlines of the memory cell array. During a read operation or a verification read operation, the page buffer circuitry may sense data stored in the selected memory cell through the bitlines. Each of the plurality of page buffers included in the page buffer circuitry may be connected to at least one bitline. Each of the plurality of page buffers may be implemented to perform sensing and latch for performing the read operation.

The I/O buffer circuitry may provide data provided from an outside to the page buffer circuitry. The I/O buffer circuitry may provide a command/address provided from the outside to the control logic. In addition, the I/O buffer circuitry may output data sensed and latched by the page buffer circuitry to the outside.

The control logic may be implemented to control the row decoder and the page buffer circuitry in response to the command delivered from the outside.

The voltage generator may be implemented to generate various types of wordline voltages to be applied to the respective wordlines under control the control logic and a well voltage to be supplied to a bulk (e.g., a well area) in which memory cells are formed. The wordline voltages applied to the respective wordlines may include a program voltage, a pass voltage, a read voltage, a read pass voltage, and the like.

A memory block (BLK1) that is one of memory blocks may be implemented in a three-dimensional (3D) structure. The memory block may include a plurality of cell strings connected to a single bitline. The plurality of cell strings may be arranged in a row direction and a column direction to form rows and columns.

In an example embodiment, cell strings may form a first row through connection to string selection lines. The cell strings may form a second row through connection to the string selection lines. Each of the plurality of cell strings may include a plurality of cell transistors. For example, each of the plurality of cell strings may include string selection transistors, a plurality of memory cells, ground selection transistors, and dummy memory cells. The plurality of memory cells may be connected in series and may be stacked in a height direction that is a direction perpendicular to a plane formed by a row direction and a column direction. The string selection transistors may be connected in series and the string selection transistors connected in series may be provided between the plurality of memory cells and bitlines. The ground selection transistors may be connected in series and the ground selection transistors connected in series may be provided between the plurality of memory cells and a common source line. In an example embodiment, a first dummy memory cell may be provided between the plurality of memory cells and the ground selection transistors. The ground selection transistors of the cell strings may be commonly connected to a ground selection line.

Referring to FIG. 11, the main controller may include a garbage collection unit, a block management unit, and a DDIB unit. The block management unit may specially manage an invalid block in which personal information is stored compared to the block management unit. For example, the block management unit may store a physical address of an invalid page for an invalid block. The DDIB unit may apply personal information discarding technology (e.g., PO/DDP) to a physical address of an invalid page.

Personal Information Discarding Verification

In response to a personal information deletion request from a host, NAND flash memory may perform a personal information deleting operation. Then, the NAND flash memory may perform a verification operation for a personal information discarding request. The verification operation of the personal information discarding request determines information to be restored of personal information requested to be discarded or whether the information to be restored is present in a valid page or an invalid page of the NAND flash memory. For example, whether the personal information and data in which the personal information is modulated is present in an invalidation area or a validity verification area of the NAND flash memory may be determined. When the personal information or data corresponding to the personal information is absent in the NAND flash memory, it is determined that the personal information discarding request is a success. After the NAND flash memory transmits this fact as a response to the host, a search for personal information for an unmapped memory block and a mapped memory block needs to be conducted to verify discarding of the personal information Performance Comparison A performance comparison was performed for the existing block erase scheme, partial overwriting scheme, SLC programming scheme, and DDP scheme. Here, the performance includes a degree of degradation in the performance of a memory cell and an elapsed time used until personal information is discarded from NAND flash memory. For convenience, a garbage collection situation was compared.

In Table 3, a garbage collection status and personal information destruction time with respect to a block erase scheme (a first comparative example), an MLC scheme (Lin's, a second comparative example), an SLC programming scheme (a second example embodiment), and a DDP scheme (a third example embodiment) are described.

TABLE 3

| Schemes | Degree of Cell Gradation | | | Privacy data Destruction Time |
|---|---|---|---|---|
| | PGM count | Erase count | Total | |
| Block Erase Scheme | 0 | 1 | a | x (until GG. > M * T $_{PGM}$) |
| Lin's Scheme | x | x | x | x |
| Partial Overwriting Scheme | <N | 0 | <b * N | M * T $_{PGM}$ + N * T $_{RDG}$ + T $_{POW}$ |
| SLC Programming Scheme | <N | 0 | <b * N | M * T $_{PGM}$ + N * T $_{SDG}$ + T $_{SLCP}$ |
| DDP Scheme | <N | 0 | <b * N | M * T $_{PGM}$ + N * T $_{DDP}$ |

It is assumed that M valid pages and N invalid pages are present between two memory blocks. Here, the M valid pages are programmed to a new memory block. It is assumed that the N invalid pages are completely present in two memory blocks. Therefore, in all schemes, M program operations are performed as a read operation for reading a valid page, which is not mentioned in a performance index due to a lower degree of degradation than that of an erase operation or a program operation. Here, a denotes a degree of cell degradation due to the erase operation and b denotes a degree of cell degradation due to the program operation. In general, a is 1000 times higher than b. That is, the degree of degradation due to the erase operation is much greater than that of the program operation. In the case of the block erase scheme, the program operation is not performed on two memory blocks to be invalidated. Instead, the program operation is performed on M valid pages for a new memory block. Therefore, the erase operation is performed once to delete personal information from a block to be invalidated. In general, a block erase operation of a garbage collection is performed according to an internal policy of NAND flash memory. The internal policy is managed to maximize a lifespan of a memory block. Therefore, as shown in Table 3, it is practically impossible to predict a personal information destruction time due to various operation variables.

On the contrary, it is possible to predict a destruction timing of the personal information by applying a deletion scheme. For example, a time of the partial overwriting scheme is M*T$_{PGM}$+N*T$_{RDG}$+T$_{POW}$, a time of the SLC programming scheme is M*T$_{PGM}$+N*T$_{SDG}$+T$_{SLCP}$, and a time of the DDP scheme is M*T$_{PGM}$+N*T$_{DDP}$. Here, T$_{PGM}$ denotes a program operation time, T$_{RDG}$ denotes a random data generation time, T$_{SDG}$ denotes an SLC data generation time, T denotes an overwrite time, T$_P$ow denotes an SLC programming time, and T$_{DDP}$ denotes a DDP application time.

TABLE 4

| Schemes | Degree of Cell Gradation | | | Privacy data Destruction Time |
|---|---|---|---|---|
| | PGM count | Erase count | Total | |
| Block Erase Scheme | 0 | 1 | a | X (until GG) |
| Lin's Scheme | 1 | 0 | b | M * T $_{PGM}$ + T $_{ONESHOT}$ |
| Partial Overwriting Scheme | 1 | 0 | b | M * T $_{PGM}$ + T $_{RDG}$ + T $_{POW}$ |

TABLE 4-continued

| | Degree of Cell Gradation | | | |
|---|---|---|---|---|
| Schemes | PGM count | Erase count | Total | Privacy data Destruction Time |
| SLC Programming Scheme | 1 | 0 | b | $M * T_{PGM} + T_{SDG} + T_{SLCP}$ |
| DDP Scheme | 1 | 0 | b | $M * T_{PGM} + T_{DDP}$ |

Summarizing, in an example embodiment according to the present invention, it is possible to predict a destruction time of personal information data. Also, comparing a degree of cell degradation for a single memory block, the block erase scheme has a degree of degradation corresponding to a single erase operation. An MLC approach scheme considers only an update situation not a garbage collection situation. According to the MLC approach scheme, it indicates that personal information is still present in an invalid block in the garbage collection situation.

Also, performance of deletion was compared with the assumption that personal information of a single page present in a single memory block is updated. On the contrary, an MLC scheme and a scheme according to example embodiments of the present invention do not need to perform an erase operation until personal information data is destroyed. Therefore, a number of program operations less than N are performed until personal information is discarded.

Even with a single page update, the existing block erase may not predict a discarding time of personal information data. On the contrary, all the MLC plans and a plan disclosed herein may predict the discarding time. In the case of the scheme according to the example embodiments of the present invention, a degradation characteristic until personal information is discarded is more excellent than the existing deletion scheme. For example, as shown in Table 4, a time of the Lin's scheme is $M*T_{PGM}+T_{ONESHOT}$, a time of the partial overwriting scheme is $M*T_{PGM}+T_{RDG}+T_{POW}$, a time of the SLC programming scheme is $M*T_{PGM}+T_{SDG}+T_{SLCP}$, and a time of the DDP scheme is $M*T_{PGM}+T_{DDP}$. Here, $T_{ONESHOT}$ denotes a one shot program time.

The scheme according to example embodiments of the present invention may significantly reduce a destruction time of personal information compared to the existing block erase scheme. Also, the scheme according to example embodiments may have many advantages in terms of degradation characteristics of a memory cell. Therefore, a personal information destruction method according to example embodiments of the present invention may easily apply to the existing NAND flash memory and may be advantageous in terms of management and economics.

A method of discarding personal information remaining in NAND flash memory according to an example embodiment of the present invention includes a method of partially identifying a programmable state and identifying personalized information using a partial overwriting scheme. A method of discarding personal information by applying a deletion duty pulse several times is also proposed. Also, there is a method of destroying personal information using an SLC programming. This personal data discarding scheme of NAND flash memory significantly reduces a degradation in memory performance compared to the existing erase operation and has significant effect in terms of time and cost.

The apparatuses described herein may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable array (FPA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be permanently or temporally embodied in any type of machine, component, physical equipment, virtual equipment, computer storage medium or device, or a signal wave to be transmitted, to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the above-described example embodiments may be configured in a form of program instructions performed through various computer methods and recorded in computer-readable media. The media may also include, alone or in combination with the program instructions, data files, data structures, and the like. The program instructions recorded in the media may be specially designed and configured for the example embodiments or may be known to those skilled in the computer software art and thereby available. Examples of the media include magnetic media such as hard disks, floppy disks, and magnetic tapes; optical media such as CD-ROM and DVDs; magneto-optical media such as floptical disks; and hardware devices that are specially configured to store program instructions, such as read-only memory (ROM), random access memory (RAM), flash memory, and the like. Examples of program instructions include both machine code, such as produced by a compiler, and files containing higher level code that may be executed by the computer using an interpreter. The hardware device may be configured to operate as one or more software modules to perform the operation of the example embodiments or vice versa.

Although the present invention is described with reference to specific example embodiments and drawings, it is provided as an example only and it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, or replaced or supplemented by other components or their equivalents. Therefore, the true technical scope of the present invention is to be defined by the technical spirit of the claims.

What is claimed is:

1. A method of destroying personal information of a non-volatile memory device including a plurality of memory blocks including a plurality of cell strings that includes at least one string selection transistor each connected between a bitline and a common source line, a plurality of memory cells corresponding to the respective wordlines, and at least one ground selection transistor, the method comprising:
    identifying at least one memory block that includes an invalid page in which personal information is stored from among the plurality of memory blocks in response to a personal information destruction request; and
    deleting the personal information by applying at least one deletion duty pulse (DDP) to a wordline corresponding to the invalid page,
    wherein a number of the at least one DDP is determined to exceed an error correction level of an error correction code (ECC).

2. The method of claim 1, wherein the personal information destruction request is received from an external device.

3. The method of claim 1, wherein each of the plurality of memory cells is a multi-level cell, and
    the number of the at least one DDP is less than a number of program pulses generated in a program operation.

4. The method of claim 1, wherein a level of the at least one DDP is greater than a level of a program pass voltage ($V_{pass}$).

5. The method of claim 1, wherein the non-volatile memory device is a NAND flash memory device, and
    the personal information destruction request is internally generated in the NAND flash memory device.

6. The method of claim 1, further comprising:
    performing a verification operation for a completion of destruction of the personal information.

7. The method of claim 6, wherein the performing the verification operation comprises determining whether the personal information or data in which the personal information is modulated is present in the invalid page of a mapped memory block among the plurality of memory blocks.

8. The method of claim 6, wherein the performing the verification operation comprises determining whether the personal information or data in which the personal information is modulated is present in mapped valid pages among the plurality of memory blocks.

9. The method of claim 6, wherein the performing the verification operation comprises determining whether the personal information or data in which the personal information is modulated is present in the invalid page of an unmapped memory block among the plurality of memory blocks.

10. The method of claim 6, wherein the performing the verification operation comprises determining whether the personal information or data in which the personal information is modulated is present in unmapped valid pages among the plurality of memory blocks.

11. A storage device comprising:
    at least one non-volatile memory device including a memory cell array with a plurality of memory blocks including a plurality of cell strings that includes at least one string selection transistor each connected between a bitline and a common source line and, a plurality of memory cells corresponding to the respective wordlines, and at least one ground selection transistor, a row decoder configured to, in response to an address, select a memory block from among the plurality of memory blocks and select a wordline from among the wordlines, a page buffer circuitry including a plurality of page buffers connected to bitlines and connected to a memory cell connected to each of the wordlines, a voltage generator configured to generate wordline voltages applied to the wordlines, and a control logic configured to control the row decoder, the page buffer circuitry, and the voltage generator; and
    a controller configured to control the at least one non-volatile memory device, to receive a personal information destruction request from an external host device, and to generate a personal information destruction command in response to the personal information destruction request,
    wherein the controller identifies at least one memory block including an invalid page in which personal information is stored from among the plurality of memory blocks,
    the control logic deletes the personal information by applying at least one deletion duty pulse (DDP) to a wordline corresponding to the invalid page in response to the personal information destruction command, and
    a number of the at least one DDP is determined to exceed an error correction level of an error correction code (ECC).

12. The storage device of claim 11, wherein each of the plurality of memory cells is a multi-level cell, and
    the number of the at least one DDP is less than a number of program pulses generated in a program operation.

13. The storage device of claim 11, wherein a level of the at least one DDP is greater than a level of a program pass voltage ($V_{pass}$).

14. The storage device of claim 11, wherein the at least one non-volatile memory device performs a verification operation for a completion of destruction of the personal information.

15. A method of destroying personal information performed by a storage device including at least one non-volatile memory device and a controller configured to control the at least one non-volatile memory device, the method comprising:
    receiving, by the controller, a personal information destruction request from a host device;
    identifying, by the controller, a page to be deleted in which the personal information is included; and
    applying, by the at least one non-volatile memory device, at least one deletion duty pulse (DDP) to a wordline corresponding to the page to be deleted,
    wherein a number of the at least one DDP is determined to exceed an error correction level of an error correction code (ECC).

16. The method of claim 15, further comprising:
    determining, by the controller, whether the personal information is present in a mapped memory block or an unmapped memory block.

17. The method of claim 15, wherein a level of the at least one DDP is higher than a level of a program pass voltage and lower than a level of a program voltage.

18. The method of claim 15, further comprising:
    transmitting, by the controller, a personal information destruction success message to the host device after completing the destruction of the personal information.

19. The method of claim 15, wherein the controller comprises a deletion duty executor configured to perform an operation of destroying the personal information in a physical address of an invalid page.

20. The method of claim 15, further comprising:
performing a verification operation that the personal information or data in which the personal information is modulated is present in mapped valid pages among the plurality of memory blocks.

\* \* \* \* \*